UNITED STATES PATENT OFFICE.

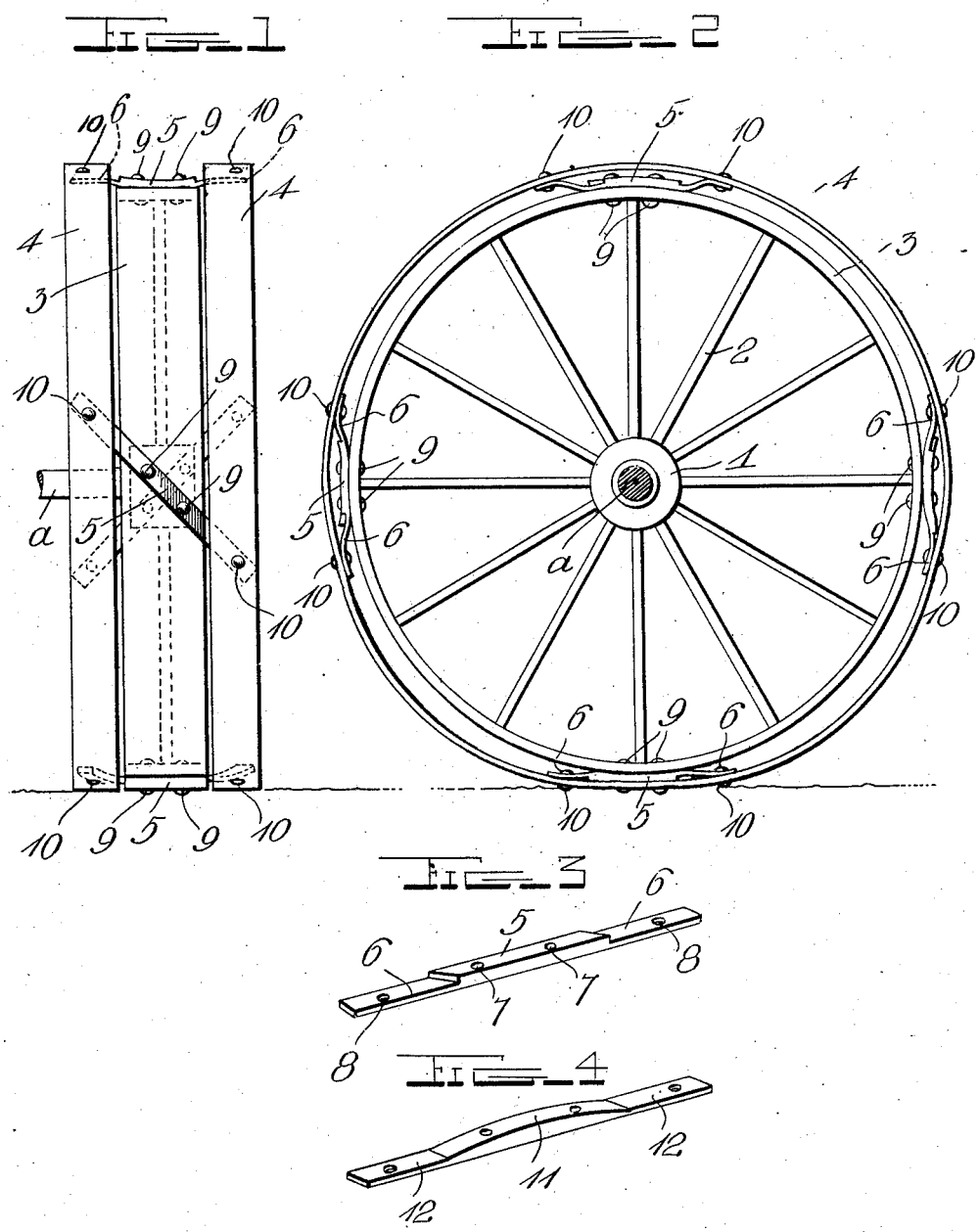

ISAIAH M. DE PEW, OF PALMA SOLA, FLORIDA.

WHEEL.

1,025,900.  Specification of Letters Patent.  Patented May 7, 1912.

Application filed June 13, 1910, Serial No. 566,543. Renewed September 21, 1911. Serial No. 650,647.

*To all whom it may concern:*

Be it known that I, ISAIAH M. DE PEW, a citizen of the United States, residing at Palma Sola, in the county of Manatee and State of Florida, have invented certain new and useful Improvements in Wheels, of which the following is a specification.

This invention relates to wheels and one of the principal objects of the same is to provide a wheel which will have a spring action and will have an extended surface bearing upon the ground in use.

Another object of the invention is to provide a wheel comprising a central nonyielding tire and spokes to which are connected oppositely disposed spring rings which will yield as the wheel passes over the ground and form an extended bearing at the tread surface of the wheel.

Still another object of the invention is to provide a spring wheel for vehicles of different characters which will yield to cushion the vehicle and at the same time to have an extended bearing upon the road bed to prevent slipping or skidding.

These and other objects may be attained by means of the construction illustrated in the accompanying drawing, in which, Figure 1 is a front elevation of a spring wheel made in accordance with my invention. Fig. 2 is a side elevation of the same, the axle being shown in section. Fig. 3 is a detail perspective view of one of the diagonal braces for connecting the spring rings to the tire of the wheel. Fig. 4 is a similar view of a slightly modified form of diagonal brace.

Referring to the drawing the numeral 1 designates the hub of the wheel, 2 are the spokes and 3 the rigid metal tire. Connected to the tire 3 at opposite sides of the wheel are spring metal rings 4, said rings being connected to the tire 3 by means of diagonal braces, each comprising a central thickened portion 5 having resilient end extensions 6. The braces 5 are each provided with rivet holes 7 in the central thickened portion 5 and similar rivet holes 8 in the extended resilient portions 6. As shown in the drawing four of these diagonal spring braces are shown, but it will be understood that any suitable number may be used, depending upon the character of the vehicle upon which the wheel is intended to be used. These diagonal spring braces are connected by means of rivets 9 to the tire 3 of the wheel and by means of rivets 10 to the spring rings 4. As shown in Fig. 4 the diagonal brace is provided with a curved central enlargement 11 and extended resilient portions 12. A brace of this character may be used upon a wheel designed more especially for speed than for heavy vehicles. It will be understood that the enlarged central portion may be varied in accordance with the character of the vehicle upon which the wheel is to be journaled and that the number of braces will be varied in accordance with the character of work to be performed by the vehicle.

From the foregoing it will be obvious that a wheel made in accordance with my invention and properly mounted upon an axle $a$ will bear upon the surface of the road bed with the spring rings lying flush with the tire 3, the rings 4 bearing upon the surface of the road bed at opposite sides of said tire. Wheels of this character will cushion the vehicle and should an obstruction be met with will yield to pass over the same. As the wheel passes over the ground the spring rings 4 will yield to the weight of the vehicle, permitting said rings to bulge slightly between the diagonal braces.

My invention is of simple construction, may be used to advantage on all characters of vehicles, is durable and efficient in use and cannot readily get out of order.

I claim:

A spring wheel comprising a rigid centrally disposed wheel, resilient rings disposed at opposite sides of said wheel, said rings being larger in diameter than the tire of said wheel, and diagonally disposed braces provided with spring portions at their ends and enlarged central portions, said braces being connected to the tire of said wheel and to said resilient rings.

In testimony whereof I affix my signature in presence of two witnesses.

ISAIAH M. DE PEW.

Witnesses:
 JAS. A. HERRIN,
 JNO. T. CAMPBELL.

Copies of this patent may be obtained for five cents each, by addressing the "Commissioner of Patents, Washington, D. C."